United States Patent
Mok et al.

(10) Patent No.: US 10,504,156 B2
(45) Date of Patent: Dec. 10, 2019

(54) PERSONALIZED MEDIA STATIONS

(71) Applicant: Apple Inc., Cupertino, CA (US)

(72) Inventors: Eva Hohei Mok, San Jose, CA (US); Payam Mirrashidi, Los Altos, CA (US); Christopher Laurence Bell, Pacifica, CA (US); Andrew Wadycki, San Mateo, CA (US); John Andrew McCulloh, Belmont, CA (US); Renée Ross, San Francisco, CA (US); Arvind S. Shenoy, San Jose, CA (US); Jayesh Krishnan, San Carlos, CA (US); Chelina Vargas, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 427 days.

(21) Appl. No.: 13/913,332

(22) Filed: Jun. 7, 2013

(65) Prior Publication Data

US 2014/0114772 A1 Apr. 24, 2014

Related U.S. Application Data

(60) Provisional application No. 61/717,598, filed on Oct. 23, 2012.

(51) Int. Cl.
 *G06Q 30/02* (2012.01)
 *G06F 16/44* (2019.01)
 *G06F 16/23* (2019.01)

(52) U.S. Cl.
 CPC ..... *G06Q 30/0271* (2013.01); *G06F 16/2386* (2019.01); *G06F 16/44* (2019.01)

(58) Field of Classification Search
None
See application file for complete search history.

(56) References Cited

U.S. PATENT DOCUMENTS

| 6,177,626 B1 | 1/2001 | Ishibashi |
| 6,947,922 B1 * | 9/2005 | Glance ............ G06F 17/30017 705/26.1 |

(Continued)

FOREIGN PATENT DOCUMENTS

| CN | 100569023 | 12/2009 |
| TW | 200921454 | 5/2009 |

(Continued)

OTHER PUBLICATIONS

International Preliminary Report from PCT Application No. PCT/US2013/066184 dated May 7, 2015.

(Continued)

*Primary Examiner* — Sun M Li
*Assistant Examiner* — Thuy N Nguyen
(74) *Attorney, Agent, or Firm* — Blank Rome LLP

(57) ABSTRACT

Systems, methods, and non-transitory computer-readable storage media for generating an internet radio media station based on metadata available on the user's media library. The media station can be generated in response to a subscription request to an internet radio service. In one example, the media station is generated without a user seed. Metadata related to the user's media library is analyzed and format rules are selected and configured according to the analysis. The format rules are associated with slots in a media station that define the playback sequence of the media station.

21 Claims, 7 Drawing Sheets

400

| | | |
|---|---|---|
| 1 | ESSENTIALS [Classic Rock] | Select from the four top selling songs in the Classic Rock Essentials. Take four each from BASICS, NEXT STEPS, & DEEP CUTS. |
| 2 | ESSENTIALS ['80s Rock] | Select from '80s Rock Essentials |
| : | : | : |
| 5 | CRITICAL PICK #1 | Select from Classic Rock format Critical Picks bucket |
| 6 | ESSENTIALS ['70s Rock] | Select a track from '70s Rock Essentials |
| 7 | ESSENTIALS [Arena Rock] | Select a track from Arena Rock Essentials |
| 8 | POWER SONG #1 | Select a high play-count recently played song in a safe segue sub-genre with release date between 1967-1989, or |
| : | : | : |
| 18 | CMA TRACK | Play the best selling track the user does not own from a CMA-able album |

450

| Name | Artist | Album |
|---|---|---|
| Suite: Judy Blue Eyes | Crosby, Stills & Nash | Crosby, Stills & Nash: Greatest Hits |
| Panama | Van Halen | The Best of Both Worlds |
| Crazy Train | Ozzy Osbourne | The Essential Ozzy Osbourne |
| Summer In the City | The Lovin' Spoonful | Platinum & Gold Collection: The Lovin' Spoonful |
| 100,000 Years | KISS | Kiss (Remastered) |
| Carry On Wayward Son | Kansas | The Best of Kansas |
| Hot Blooded | Foreigner | No End In Sight: The Very Best of Foreigner (R... |
| All Right Now | Free | 20th Century Masters - The Millennium Collec... |
| Piece of My Heart | Janis Joplin | Janis Joplin's Greatest Hits |
| Don't Stop Me Now | Queen | Jazz |
| Sharp Dressed Man | ZZ Top | Rancho Texicano: The Very Best of ZZ Top (Re... |

(56) References Cited

U.S. PATENT DOCUMENTS

| | | | |
|---|---|---|---|
| 6,965,770 B2 | 11/2005 | Walsh et al. | |
| 7,363,372 B2 | 4/2008 | Potenzone et al. | |
| 8,244,171 B2* | 8/2012 | Ingrassia | H04H 20/26 455/154.1 |
| 2002/0082983 A1 | 6/2002 | Oshiba et al. | |
| 2002/0130898 A1 | 9/2002 | Ogawa et al. | |
| 2002/0152278 A1 | 10/2002 | Pontenzone et al. | |
| 2003/0050058 A1 | 3/2003 | Walsh et al. | |
| 2003/0183064 A1* | 10/2003 | Eugene | G10H 1/0033 84/609 |
| 2005/0021497 A1 | 1/2005 | Kohno | |
| 2006/0143236 A1 | 6/2006 | Wu | |
| 2006/0174269 A1* | 8/2006 | Hansen-Turton | H04N 5/44543 725/39 |
| 2007/0106693 A1 | 5/2007 | Houh et al. | |
| 2007/0208771 A1 | 9/2007 | Platt | |
| 2007/0256021 A1 | 11/2007 | Prager et al. | |
| 2008/0162570 A1 | 7/2008 | Kindig et al. | |
| 2008/0263098 A1 | 10/2008 | Kindig | |
| 2010/0023860 A1 | 1/2010 | Toro-Lisoni | |
| 2010/0312369 A1* | 12/2010 | Dollar, Jr. | G06F 17/30749 700/94 |
| 2010/0318544 A1* | 12/2010 | Nicolov | G06F 17/30035 707/759 |
| 2010/0325683 A1* | 12/2010 | Karaoguz | G06F 3/1415 725/134 |
| 2011/0060738 A1* | 3/2011 | Gates | G06F 17/30749 707/737 |
| 2011/0078323 A1 | 3/2011 | Wooden | |
| 2012/0096088 A1 | 4/2012 | Fahmy | |
| 2013/0024546 A1* | 1/2013 | Carhart | H04H 20/103 709/217 |
| 2013/0091523 A1* | 4/2013 | McCarthy | G11B 27/034 725/46 |
| 2013/0287212 A1* | 10/2013 | Marko | H04H 20/88 381/2 |
| 2013/0305154 A1* | 11/2013 | Attwell | H04H 60/06 715/716 |
| 2014/0053188 A1* | 2/2014 | Haberman | G11B 27/031 725/34 |
| 2014/0282671 A1 | 9/2014 | McMillan | |

FOREIGN PATENT DOCUMENTS

| | | |
|---|---|---|
| TW | 201003421 | 1/2010 |
| WO | 2000/45511 | 8/2000 |

OTHER PUBLICATIONS

International Search Report and Written Opinion from PCT Application No.PCT/US2013/066184 dated Dec. 4, 2014.

* cited by examiner

| | | |
|---|---|---|
| 1 | ESSENTIALS [Classic Rock] | Select from the four top selling songs in the Classic Rock Essentials. Take four each from BASICS, NEXT STEPS, & DEEP CUTS. |
| 2 | ESSENTIALS [80s Rock] | Select from '80s Rock Essentials |
| ... | | |
| 5 | CRITICAL PICK #1 | Select from Classic Rock format Critical Picks bucket |
| 6 | ESSENTIALS [70s Rock] | Select a track from '70s Rock Essentials |
| 7 | ESSENTIALS [Arena Rock] | Select a track from Arena Rock Essentials |
| 8 | POWER SONG #1 | Select a high play-count recently played song in a safe segue sub-genre with release date between 1987-1989, or ... |
| ... | | |
| 18 | CMA TRACK | Play the best selling track the user does not own from a CMA-able album |

| Name | Artist | Album |
|---|---|---|
| Suite: Judy Blue Eyes | Crosby, Stills & Nash | Crosby, Stills & Nash: Greatest Hits |
| Panama | Van Halen | The Best of Both Worlds |
| Crazy Train | Ozzy Osbourne | The Essential Ozzy Osbourne |
| Summer In the City | The Lovin' Spoonful | Platinum & Gold Collection: The Lovin' Spoonful |
| 100,000 Years | KISS | Kiss (Remastered) |
| Carry On Wayward Son | Kansas | The Best of Kansas |
| Hot Blooded | Foreigner | No End In Sight: The Very Best of Foreigner (R... |
| All Right Now | Free | 20th Century Masters - The Millennium Collec... |
| Piece of My Heart | Janis Joplin | Janis Joplin's Greatest Hits |
| Don't Stop Me Now | Queen | Jazz |
| Sharp Dressed Man | ZZ Top | Rancho Texicano: The Very Best of ZZ Top (Re... |

PERSONALIZED MEDIA STATIONS

CROSS REFERENCE TO RELATED APPLICATIONS

This application claims the benefit of U.S. provisional application No. 61/717,598 filed on Oct. 23, 2012, which is expressly incorporated by reference herein in its entirety.

TECHNICAL FIELD

The present technology pertains to algorithmically created media station programming, and more specifically pertains to algorithmically created media station programming by online media distribution services.

BACKGROUND

Like many other processes, the programming of media stations has become increasingly reliant on algorithms for selecting and scheduling content. For example, terrestrial radio use qualitative market research and quantitative analytical research to select songs to play and when to play them by taking into account parameters that define the media stations—most importantly genre and demographic information. The results commonly dictate playing a tight rotation of the same 20-30 songs from a pool of as few as 200-300 songs in rotation. Often these songs are selected from a short list of media items being promoted by one or more record labels.

Another common form of algorithmically created media station programming includes Internet radio stations such as PANDORA and IHEART RADIO, among others. PANDORA's media stations are typically characterized by media items that have similar intrinsic musicological attributes to a seed or set of organizing principles governing items played on the media station. PANDORA utilizes a robust database of metadata attributes describing media items and selects media items that have similar metadata attributes.

While popular, PANDORA's stations are prone to playing media that the listener may not like or identify with. This is likely because PANDORA predominately takes into account only one or two types of data at most (i.e. similar types of metadata or musicological attributes) when creating stations.

In addition to algorithmically created media station programming services, there are many websites that publish playlists of media items created by human editors. However, these playlists are made without any regard for the listening tastes of a user.

In an attempt to remedy the deficiencies in the art stemming from only using one type of data, PANDORA now keeps track of media items that a user likes and doesn't like, and plays those media items less frequently, but this isn't a sufficient solution. Utilizing a diverse array of data types has proven difficult.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, devices, and non-transitory computer-readable storage media for generating algorithmically created media stations. Such media stations are created from a diverse array of data types including user profile data, media item metadata, similarity data derived from collaborative filtering, commercial promotional data, and culturally informed editorial data. In some embodiments, user profile data includes data derived from an online media store including media item purchase data, and listening data.

As used herein a media station is defined as an algorithmically created collection of media items of which the selection and order of the media items is exclusively determined by an algorithm. Each time a user engages with a media station the algorithm will uniquely select media items for playback to the user. In some embodiments a user can skip a media item played-back on the media station, but the listener otherwise has no control over the order of media items presented. The term media station is used in contrast to "playlist" which is a published list of media items, and for which the order and even inclusion of media items is commonly subject to some degree of manipulation by a user and/or music editor.

A media station can include format rules that define the content on the media station. Each format rule can be used to identify media item candidates that can be played on the media station. For example, a processor can execute a format rule to identify one or more media items from a media item database. These media items can be candidates for playback on the media station. In one embodiment, a media station can include an ordered list of slots where each slot is configured to store one or more format rules. Playback of the media station can involve iterating through the list of slots. When playback advances to a given slot, a format rule associated with the slot can be executed and a media item from the media item database can be selected for playback. In some examples, a collection of media items are identified from a format rule and the media station can select a media item from the collection to play. In some embodiments, the media item selected can vary depending on changes to the media item database or attributes of the media items in the database. In some embodiments a media item can be selected from a collection after a weighting process taking into account one or more factors such as user preferences stored in a user profile to select the media item. The slots can be sequenced to represent an order in which format rules are executed resulting in media items being selected for playback on the media station in a unique sequence for each individual user.

As content from a media station is presented to the listener, user feedback on the presented media items can be provided by the listener. The user feedback can be processed to edit the media station and optionally edit global parameters or relationships between media items. For example, the user feedback of media items that the listener dislikes can be banned from the media station. In some embodiments the user feedback can be utilized as weighting criteria in selecting a media item candidate for a playback on a media station either on the currently playing media station or in a future selection and listening session the user may interact with. In some embodiments, relationships between media items that the listener likes can be created if many listeners in the system provide similar feedback. In some examples, media items having similar user feedback can be clustered and used to create generalizations about the listener's tastes and preferences. The clustered feedback can also be used to identify other media items that the user may like.

The present technology includes a media station generation system including a database of media item candidates. Some databases can be populated with potential media items based on an analysis of a user's purchased and/or uploaded media library. In one example, a user's media library can be analyzed and media items that are similar to media items in a user's library can be collected into a similarity database. Some databases can be populated with lists of media items deemed appropriate by an editor. Such editorial databases include media items appropriate for a given situation, such as "working out," or "quiet moods," or "celebrations" while other editorial databases included media items appropriate for a particular genre, or meet some other criteria for inclusion in the database by an editor. Some databases can be commercially driven and include media items that are selected by algorithms of an online store to target media items to a user based on a prediction to drive purchases of the song or album on which it appears. For example a database of music albums can be created that includes music albums for which a user already owns one or more songs from that media item. This database can be used to program media stations that encourage exposure to and purchase of the rest of the album dynamically.

In some embodiments, the system includes databases of media items that can be considered similar based on their intrinsic attributes. Such determination can be made after analyzing media and representing them as vectors created based on metadata describing intrinsic characteristics such as genre, artist, origin, beat, tempo, mood or energy level, etc. After representing the media items as vectors, they can be organized into clusters of roughly similar media items and recorded in databases of similar media items specifically to influence the programming of the media stations.

In some embodiments extrinsic data from a collaborative filtering process can be utilized in the clustering process.

In some embodiments media items classified in a same or similar genre can be clustered and the resulting clusters can be deemed to be sub-genres. The distance between the sub-genres can be determined and sub-genres that are relatively close can be considered compatible sub-genres, while sub-genres that are relatively far apart can be considered non-compatible sub-genres. In some embodiments the distance measurement is performed by mapping the clusters to a coordinate space and measuring a distance between them. This analysis can be used to generate a list of sub-genres that go well together and can be included in a list of "safe segue" sub-genres which indicates their compatibility. The inverse list of "unsafe segues" can also be recorded and used to prohibit media items that are not compatible from being played in the same media station.

In addition to media item candidate databases, the system can include databases of user preferences and observable trends on their store and radio station account. Such preferences could be represented in many forms, but one example is in the form of feature vectors. A user's library, or listening data can be used to generate a feature vector that represents a user's listening taste. The vector can be predominately weighted towards one or more feature or characteristic and many vectors could be used to represent different aspects of a user's preferences. However, candidates being considered for inclusion in a media station could be compared against such a vector. In some embodiments, the user preferences in the user preference database can be used to weight candidates using a scoring system.

The media station generation system further includes a station generation module for creating a media station according to a list of rules known as a programming model. In some embodiments the programming model includes a plurality of slots, with each slot being assigned a media selection rule to be used in selecting a media item to be presented at that slot in the media station program. The media selection rules can select media items from one or more of the databases introduced above.

In some embodiments, data can be shared between the online store, pools of media items, and the station creation module to reflexively update each other. For example, as described above data from an online store can be used to create a pool of media item candidates appropriate for the user. Such pool can be used by the media station generation module to select media items for inclusion in a media station.

However, the media items presented to the user in the media station can be communicated to the online store where they can be promoted for sale. Media items that are purchased or rated highly can then be used to refresh the pools of media items used by the media station generation module to create media stations.

Accordingly, the present technology provides an advanced and sophisticated blending of diverse data sources to generate high quality media stations that are customized to a user's tastes. The system can further learn about a user's changing or evolving tastes through monitoring the user's interactions with the system and refine the media station and online store offerings over time.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4a illustrates an exemplary media station generation rule;

FIG. 4b illustrates and exemplary output of a media station programming format;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

As used herein, the term "user" shall be considered to mean a user of an electronic device(s). Actions performed by a user in the context of computer software shall be considered to be actions taken by a user to provide an input to the electronic device(s) to cause the electronic device to perform the steps embodied in computer software unless explicitly stated otherwise. In some instances a user can refer to a user account or profile associated with a particular electronic device. For example user preferences refer to data stored in association within a user account or profile that can reflect a user's real life preferences.

Figure 1:
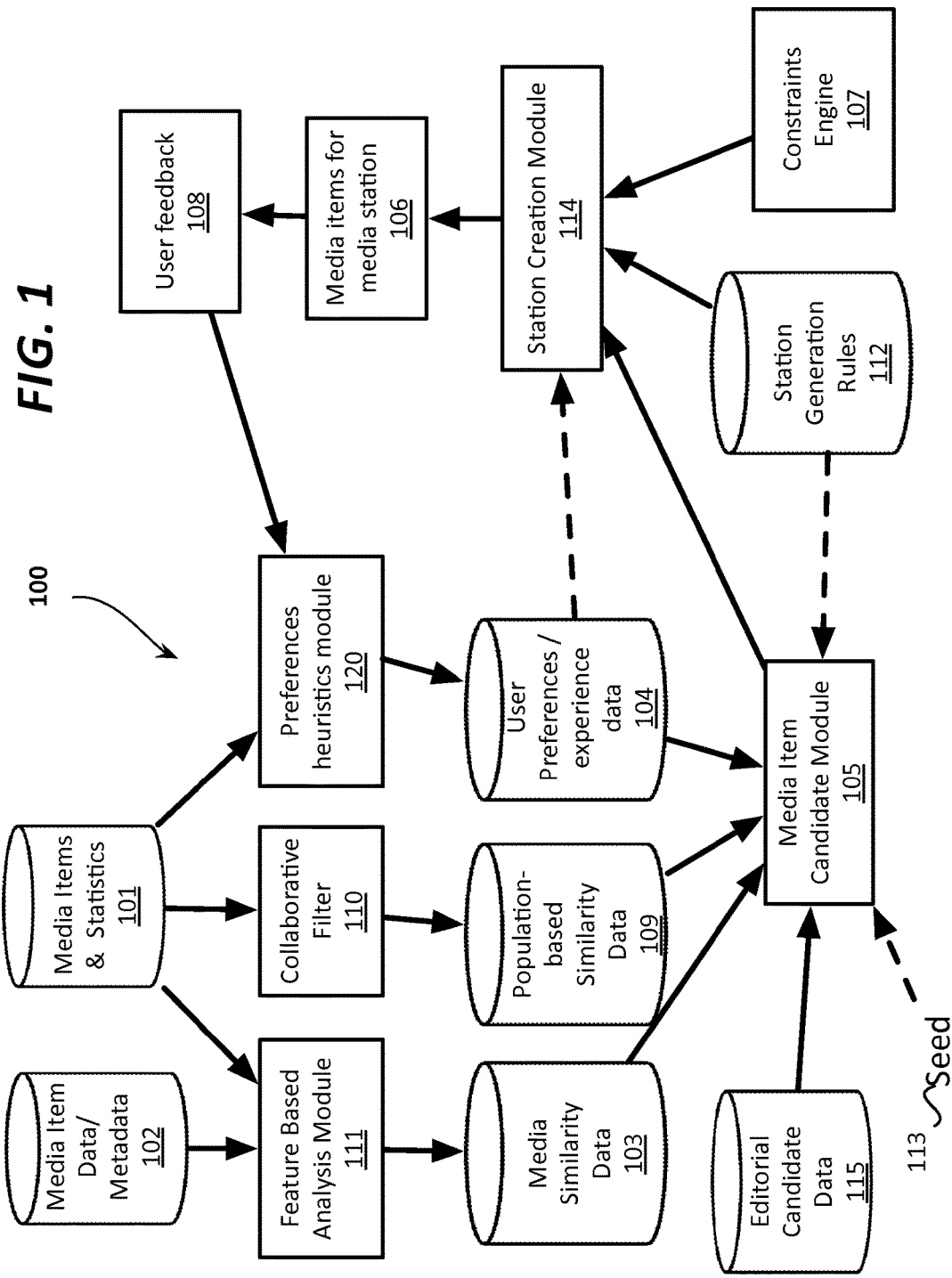
FIG. 1 illustrates an exemplary media station generation system.

FIG. 1 illustrates an exemplary media station generation system. The exemplary media station generation system 100 is configured to create a media station based on a station generation rule 112 taking into account a diverse array of user specific data, population influenced data, editorial data, promotional data, and media item characteristic data. The station generation rules can include rules for creating a station based on seed song, rules for creating a heuristically influenced station, rules for creating an editorially formatted station (for example, based on a genre or theme), rules for creating a station tailored to a listener's preferences as derived from user preferences/experiences heuristics and stored database 104, and rules for creating sponsored stations, etc.

The exemplary media station generation system 100 includes a station creation module 114 which creates media stations using one or more rules from the station generation rules database 112 using media candidates from databases 103, 104, 109, and 115.

The media similarity database 103 is a collection of media items deemed similar based on characteristics of the media items. As illustrated in FIG. 1 a collection of media items and any associated data or metadata in database 102 can be used by a feature based analysis module 111 to perform an analysis, by way of example a clustering analysis or locality sensitive hashing analysis, to determine other media items that are similar. The feature based analysis module 111 determines which media items are potentially similar based on characteristics of the media item. The output of such analysis is stored in the media similarity database 103. In some embodiments the output is used to generate a list of candidate media items that are characteristically similar to one or more other media items that may be used by the station creation module 114 to create the media station. In some embodiments the output is used to generate feature vector that can represent a representative media item in a media item cluster, and station creation module 114 can compare potential media item candidates for similarity with the feature vector when creating a media station.

Feature based analysis module 111 can be configured to cluster media items into collections or groups based on the features of the media items. Feature based analysis module can utilize media item information and statistics about media item playback from the media items and statistics database 101 and media item metadata from the media items metadata database 102 to cluster the media items to determine media items that are characteristically similar. For example, statistics from media items and statistics database 101 can include the frequency that media items are presented in user's personal media libraries, relationships between purchases (e.g., many users who purchased this media item also purchased that media item), relationships between media items (e.g., users often place this media item and that media item together in the same playlist), and others. Media item metadata database 102 can include metadata of media items such as genre, era, tempo, energy, and mood.

In some embodiments, the values for a property can include hierarchical relationships such that relationships can be created between media items having different property values. For example, the era property value 1980's can be hierarchically related to era property value representing each individual year in the decade. As another example, the genre property value jazz can be hierarchically related to genre property values hard bop, cool jazz, free jazz, swing, jazz rock, soul jazz, and Latin Jazz.

Some embodiments of feature based clustering can include creating a multi-dimensional vector for each media item. The vector can be configured to represent the statistics and metadata related to a specific media item. Each dimension of the vector can be associated with a feature or attribute of the media item. For example, one dimension can represent the popularity of the media item while another represents the tempo of the media item while another represents the genre of the media item. Once a vector has been generated for each media item, the media items can be clustered according to their respective vectors. In one example, vectors that are within a predetermined proximity of one another can be clustered together.

In some embodiments, vectors that are within a predetermined proximity of other vectors are clustered, and a feature vector representing the overall cluster can be generated. In some embodiments, the feature vector can representative of a particular genre, era, tempo, or mood value if one of these characteristics is the predominate feature resulting in the grouping of media items into a cluster. Thus, the resulting cluster of vectors will contain media items that have a similar property value. The collections or groups that result from feature based clustering by feature based analysis module 111 can be stored in media similarity database 103.

The population-based similarity database 109 is a collection of media items which are deemed similar based on an analysis of engagement data from a population of users, also known as collaborative filtering. Population-based similarity database 109 is derived from an analysis by collaborative filter 110 of data in the media items and statistics database 101 which includes the all-time purchase history of each user, the personal media library of each user (i.e., media the user has purchased from the system plus media that the user personally owns), and other media related metadata associated with the user including user engagement history with media items. In some embodiments, this user engagement history can be reported to an online store by a media playing client on a user's media playing device, personal computer, laptop, mobile device, etc, and stored in database 101.

Collaborative filter 110 can be configured to perform collaborative filtering on information in database 101 to generate similarity database 109. Collaborative filtering can include generating a similarity value that describes the similarity between two media items and storing the similarity value in similarity database 109. Collaborative filtering can also include grouping similar media items into collections and storing the collections in similarity database 109. Collaborative filtering can also include applying pattern recognition or other heuristic techniques to information available about users such as media related metadata to generate taste and preference information. This can create generalizations as to what media items users commonly purchase together, similarities between the media items that are present in user's personal media libraries, similarities in user's personal libraries, media items that are commonly not played together, and others. In some examples where a collection of media items is created, the collection can be represented as a feature vector.

In some embodiments, collaborative filter 110 analyzes data in database 101 to determine which media items are statistically most likely to co-occur in users' media libraries. Items that co-occur in users' media libraries can be said to be similar. More detail on this process can be found in application Ser. No. 12/646,916, filed on Dec. 23, 2009 which is expressly incorporated by reference herein, in its entirety.

Candidates can also be selected from editorial candidate database 115 which contains a collection media items that have been identified by editors to go well with a specified genre. For example, editorial tags can be useful to proxy play count data for new or under-exposed songs in the database. Typically a new song has little airplay and little to no feedback. Therefore the song has little visibility and is unlikely to be selected for playback. By attaching an editorial tag, the new song can be promoted and gain traction from listeners. For example, a format rule can be configured to select a media item having a particular editorial tag such as "new music: jazz." Editorial tags can also be used to identify picks by the editorial staff or to identify iconic media items of a specific genre that should be included in a media station focusing on that genre.

Additionally, user preference data 104, can be used to determine candidates. User preference data can include the genre, mood, energy, era, or other media property associated with media items purchased, user rating, media items included in a playlist, recently played, or frequently played, etc. For example, the taste user preference data can include a notice that the majority of media items purchased by a user have been from the music genre jazz or have been from the 2010 era of an artist whose collection spans many decades. User preference data can also include data on skips, or poor ratings of media items. In some embodiments, this data can be used to weight candidate media items.

User preference data can be derived from an analysis by preferences heuristics module 120 of a variety of sources of data including a media items and statistics database 101, and data regarding user feedback 108 on media items experienced through media stations.

In some embodiments, in addition to the user preferences listed above can also include a determination that a user prefers to experience more new media items as opposed to familiar media items, or vice versa. This can be achieved by monitoring user experience data, and if a user is skipping or rating poorly a disproportionate number of new media items, but experiencing familiar media items, it can be assumed that the user prefers to experience to more hits, than discover new media items. The inverse can also be true, in which it can be assumed that a user has an interest in media item discovery. The fact that a user has an interest in media item discovery might also be inferred from more relaxed requirements. Since it is not likely a user will rate every new media item highly, it may be inferred that a user enjoys/prefers media item discovery when a user doesn't skip many newly experienced media items, or rates a small portion of them highly. Another factor can be that a user purchases some of the newly experienced media items. In some embodiments, the system can experiment with a user to determine this preference by playing more new media items in one experience and if the system does not observe many negative signals such as skips and bans of media items, short experience duration it can be assumed the user has a preference for new media item discovery.

In some embodiments, a user preference can be determined from observing a user's actions in response to suggesting media items to purchase (either through explicit suggestion or implicit suggestion by exposing the user to the media item through playback on a media station). For example, if a user were to purchase an album after being exposed to several songs on that album, this would be suggestive of a user's interest in this genre and artist, as well as the user's interest in owning albums as opposed to singles, which itself implies the user is interested in hearing less popular tracks from at least some artists.

In some embodiments a seed media item 113 (or multiple seed media items) can be used to determine appropriate media item candidates for a media station by determining similar media items to the seed media item 113. In some embodiments, the seed can be a media item such as a song or can be a characteristic of a media item such as an artist, album, genre, etc. A feature vector can be created based on the seed media item and similar media items can be selected by comparing the feature vector of the seed media item with similarity data 103 or 109. For example, one or more media items having a vector similar to the feature vector of the seed media item can be selected. As another example, a collection of media items can be selected when the feature vector of the seed media item is similar (within a predetermined distance) to a feature vector that represents the collection of media items. In another embodiment, the seed media item can be an artist or genre instead of an actual media item. The seed artist or genre can be processed by the media item candidate module 105 to create a media station. This can include analyzing the seed in view of user preferences 104 to determine one or more media items from the user's personal media library that are can represent the media station. Media item candidates 105 for the media station can in turn be selected by comparing feature vectors of the one or more representative media items to the vectors in similarity data 103.

In some embodiments, media station generation rules 112 can be used by the media item candidate module 105 to determine appropriate media item candidates 105.

FIG. 1 also illustrates a media station creation module 114 that interprets media station generation rules from media station generation rules database 112 to create media stations using the media item candidates 105.

In some embodiments, media station generation rules database 112 includes rules or an algorithm for creating a personalized media station that is personalized for a specific user or user account. The media item candidate module can use the media station generation rules 112 for a personalized media station to generate a list of candidate media items 105. The station creation module 114 can further utilize the media station generation rules 112 for a personalized media station to select from the candidate media items to generate a media station that is personalized for a specific user or user account.

In some embodiments the media item candidate module 105 can analyze user information from user preferences database 104 which can include a list of the media items in the user's personal media library, the user's ratings of and interaction with those media items, user playlists, and other media related information associated with the user to aid in determining candidates 105.

In some embodiments, station creation module 114 can apply heuristic analysis to user preferences database 104 and use this analysis to select one of a plurality of formatted media stations as being most appropriate for a user's tastes.

In some embodiments, station generation rules 112 can be used by station creation module 114 to receive seed media item 113 and select one or more media items based on that seed. In some embodiments of a seed based station, media items having the same or similar genre and/or safe-segue parameters as the seed as the seed can be selected as candidate. In some embodiments, media items that are similar to the seed can be selected as candidates. In some embodiments, an author or an artist of the seed media item can be used to select other media items by the same or similar artist(s) or author(s).

In some embodiments, more than one media item can be used as a seed. In such embodiments, the characteristics of the multiple media items can be averaged, for example in the form of a feature vector. The feature vector can then be treated as if it were a single seed media item. In some embodiments the seed media item can be from a collection of seed media items provided by editors or genre experts.

In some embodiments, the station generation rules module 112 can include rules for creating editorially formatted stations.

System 100 further includes station creation module 114. Station creation module 114 can be configured to select media items for a media station. As illustrated in FIG. 1, station creation module 114 can receive inputs including station generation rules 112, user preferences data 104, and media item candidates 105. Station creation module 114 can select media items that meet a given station generation rule's parameters.

System 100 further includes constraints engine 107. Constraints engine 107 can include one or more rules that constrain which candidates may be selected, even if a given candidate is otherwise optimal. For example, the constraint can include DCMA rules for the number of times a media item can be played back, or the constraints can include media items not to be played on the media station based on user feedback or media item analysis, or constraints can include editorially determined rules. In some embodiments, the constraints applied by constraints engine 107 can depend on the user's media library. For example, analysis of the user's personal library can lead to the discovery that the user does not like 80's rock. As a result, a new constraint to avoid 80s rock can be applied by constraints engine 107 when selecting media items.

As illustrated in FIG. 1, station creation module 114 outputs media items 106 for a media station, which are presented to a user. As the user experiences media items presented as part of the media station, the user may provide feedback 108, such as buying the media item, rating it highly, skipping it, banning it, rating it poorly, tagging a media item, putting the media item in a wish list to purchase later etc. User feedback 108, including a listing of all media items presented to the user can be stored in user preferences/experiences database 104.

Figure 2:
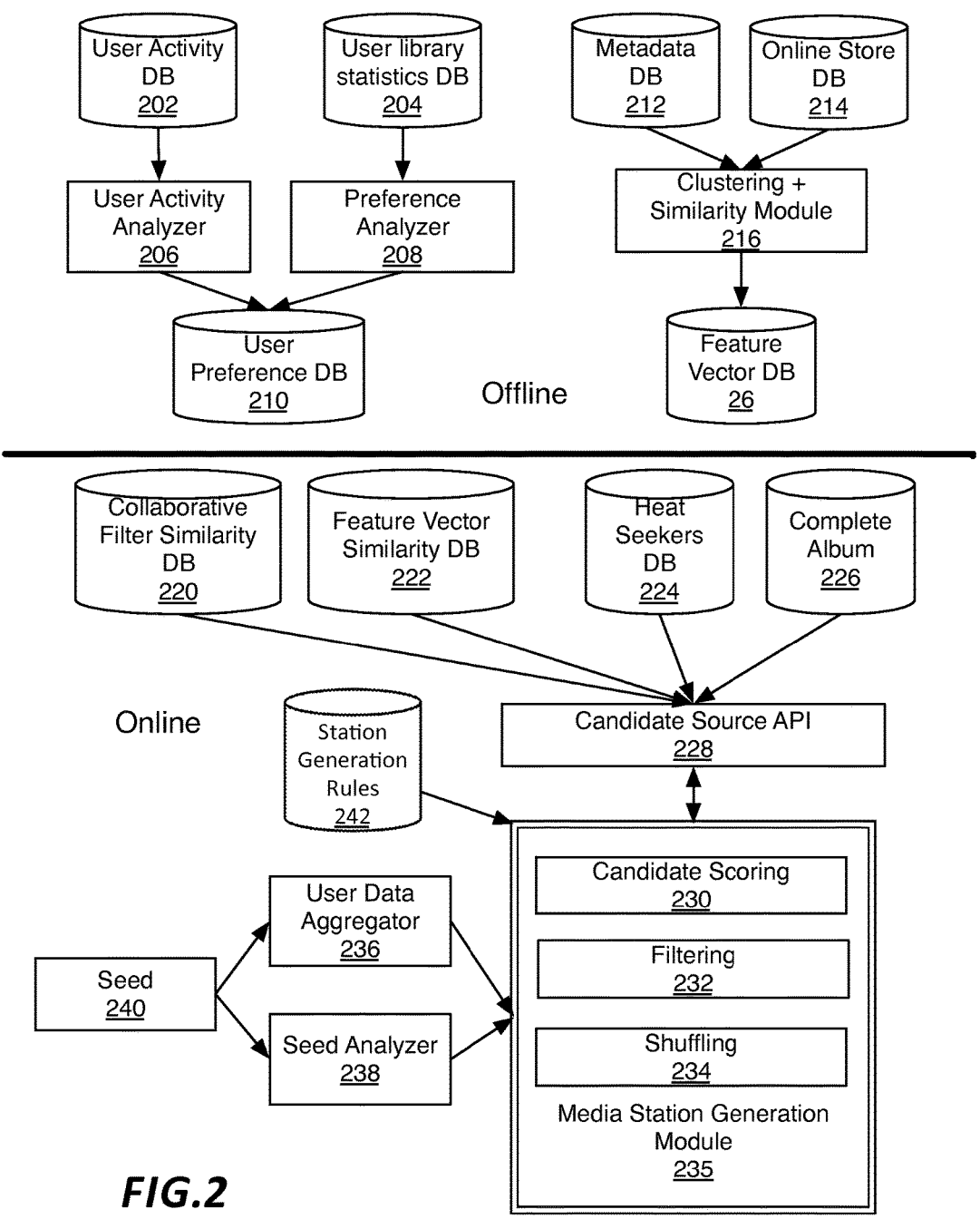
FIG. 2 illustrates an exemplary media station generation system.

FIG. 2 illustrates a further exemplary system configuration. FIG. 2 emphasizes portions of the system for which processing is performed offline and portions of the system which are performed online (i.e., at the time a media station is requested). Portions of FIG. 2 overlap with FIG. 1, with some components being described with slight variations.

Persons of ordinary skill in the art will appreciate that portions of FIG. 2 can be added to, or substituted for, one or more components illustrated in FIG. 1.

FIG. 2, like FIG. 1 illustrates a system in which diverse data sources can be used to create a media station. For example both figures illustrate a source of data that comes from analyses of users libraries (101, 110, 109 of FIG. 1, and 202, 204, 206, 208, 210, 220 of FIG. 2). Both figures also illustrate a source of data that comes from analyses of media item intrinsic metadata such as genre, title, artist, tempo, beat, origin, etc. (102, 111, 103 of FIG. 1, and 212, 216, 218, 222 of FIG. 2). Both figures also illustrate a source of data that comes from editorial choices and commercial priorities (generically 115 in FIG. 1, and more specific exemplary databases 224, 225 in FIG. 2). Both figures also illustrate one or more components for generating a station (107, 112, 114 of FIG. 1, and 230, 232, and 234 of FIG. 2). While the above discussion of this paragraph draws similarities between FIG. 1 and FIG. 2 for the benefit of the reader, such discussion should not be considered limiting. Additional, different, or alternative components might be considered as part of a data source or components for generating a media station. For example, while 236, 238, and 240, could be considered components used in generating a media station, they might also be components used in selecting similar media items to a seed media item from users' libraries.

Now discussing on FIG. 2 in more detail: FIG. 2 illustrates offline components for analyzing user's libraries. Each user library is analyzed to determine individual user's preferences, as well as to generate lists of media items determined to be similar to other media items in an individual user's media library (e.g., through a collaborative filtering process—more detail on this process can be found in application Ser. No. 12/646,916, filed on Dec. 23, 2009 which is expressly incorporated by reference herein, in its entirety). Specifically FIG. 2 illustrates a user activity database 202 that includes records of an individual user's media library activity (e.g., media items purchased, user rating, media items included in a playlist, frequently played, media item experience history, skip count, media item ratings, etc.). User library statics database 204 includes records of individual user's media items and information about those media items. In some embodiments, database 204 includes records of a user's experiences with media items whether on their personal media devices, or through experiencing media items presented by the media station generation module 235. Databases 202 and 204 can be analyzed by user activity analyzer 206 and default preference analyzer 208, respectively. Collectively these two analyzer modules 206 and 208 serve to analyze the respective data stores 202 and 204 to determine user preferences 210. For example user activity analyzer 206 determines such information as what media items a user experiences repeatedly, or has been experiencing a lot recently. In some embodiments activity analyzer 206 can also be used to make a determination that a user prefers to experience more new media items as opposed to familiar media items, or vice versa, by analyzing user experience data recorded in user activity database 202. Default preference analyzer 208 determines library specific information such as the genres that are predominant in a user's library, favorite artists, seminal genres, seminal artists, etc. In some embodiments, a histogram of seminal artists within the user's seminal genres occurring in the media library can be instructive in shaping media item selection and candidates to play on the media stations. Additional preferences that can be determined include a user's tolerance for experience popular media items as opposed to a user's preference to be introduced to new media items. Such information is stored in user preference database 210. For example user preference database 210 can include records such as a listing of all media items similar to each media item in a user's media library, favorite genres favorite media items, favorite artists, disliked media items, current favorites, etc. Such analysis and records are ultimately created for each user offline and are updated periodically to take into account changes in library characteristics and current experience habits.

In some embodiments, user activity analyzer can be useful in disambiguating multiple users using a single account by identifying breaks in usage patterns, demographics, and genre affinity etc. In some embodiments, the user activity analyzer can even analyze applications downloaded by a user device which can further be used to identify multiple users on a single account. In such embodiments, the media station generation system can attempt to identify which of the multiple users is presently using the account use only preferences specific for that user of the account.

In addition to the components of FIG. 2 that perform an analysis of users libraries, FIG. 2 also includes offline processing of attributes intrinsic to media items themselves. Metadata database 212 includes data about media items. Metadata can be from one or more sources, and includes data on attributes intrinsic to media items. By intrinsic to media items it is meant that the data describes the media item itself. Specifically not included in the term intrinsic attributes is data that describes a user's subjective view of a media item. For example, intrinsic data can include a title, artist, collection, album, genre, tempo, beat, origin (i.e., geographic roots of artist), publisher, or other characteristic of the media item itself. Data that is not intrinsic data includes user ratings, skip counts, energy, bans, likes, tags, etc.

Online store database 214 can further include an additional source of metadata regarding a media item. This database also includes data that is descriptive of the media item, but may also include editorial metadata. For example online store editors may curate data that indicates if a media item is associated with a particular era, sub-genre, popularity of the media item, etc. In some embodiments, the online store database 214 can also include purchase histories and experience histories of media items based on the aggregated data observed from transactions in the online store. Such data can be used to make fine distinctions between media items and their similarity. For example, an analysis of purchase data might reveal that users' that buy songs from an artist in the 70's might not continue to buy songs from the same artist published in the 90's. Thus, this data could indicate that songs by this artist from the 70's and 90's might not be very similar even though they are by the same artist. It will be appreciated that one or more data items in databases 212 and 214 could be overlapping. In some embodiments, databases 212 and 214 could be the same database.

Such intrinsic attributes and editorial attributes can be used by clustering and similarity module 217 to represent each media item as a vector. In some embodiments media items can be represented as multi-dimensional vectors by taking into account many attributes of the media item. The vectors can be mathematically processed through a known clustering technique such as locality sensitive hashing, or other algorithmic clustering technique to group similar media items together. In some embodiments the clustering technique can be a k-means clustering analysis. Such technique is described in greater detail application Ser. No. 12/646,916, filed on Dec. 23, 2009 which is expressly incorporated by reference herein, in its entirety.

In some embodiments the clustering can be performed by a technique known in the art as locality sensitive hashing whereby the vectors are analyzed to create a signature matrix. A signature matrix can be a conversion of the vectors as represented in a highly multi-dimensional space into a digital representation of binary 1's and 0's reflecting the presence or absence of a given attribute. The media items, now reflected in the signature matrix can be hashed using a collision hashing algorithm that can hash similar input items into the same bucket. These buckets can then be mapped or at least used to measure distances between the media items grouped within the buckets. The angular distance between each media item, or each bucket, can be used as a measure of similarity between the media items or buckets.

Figure 3:
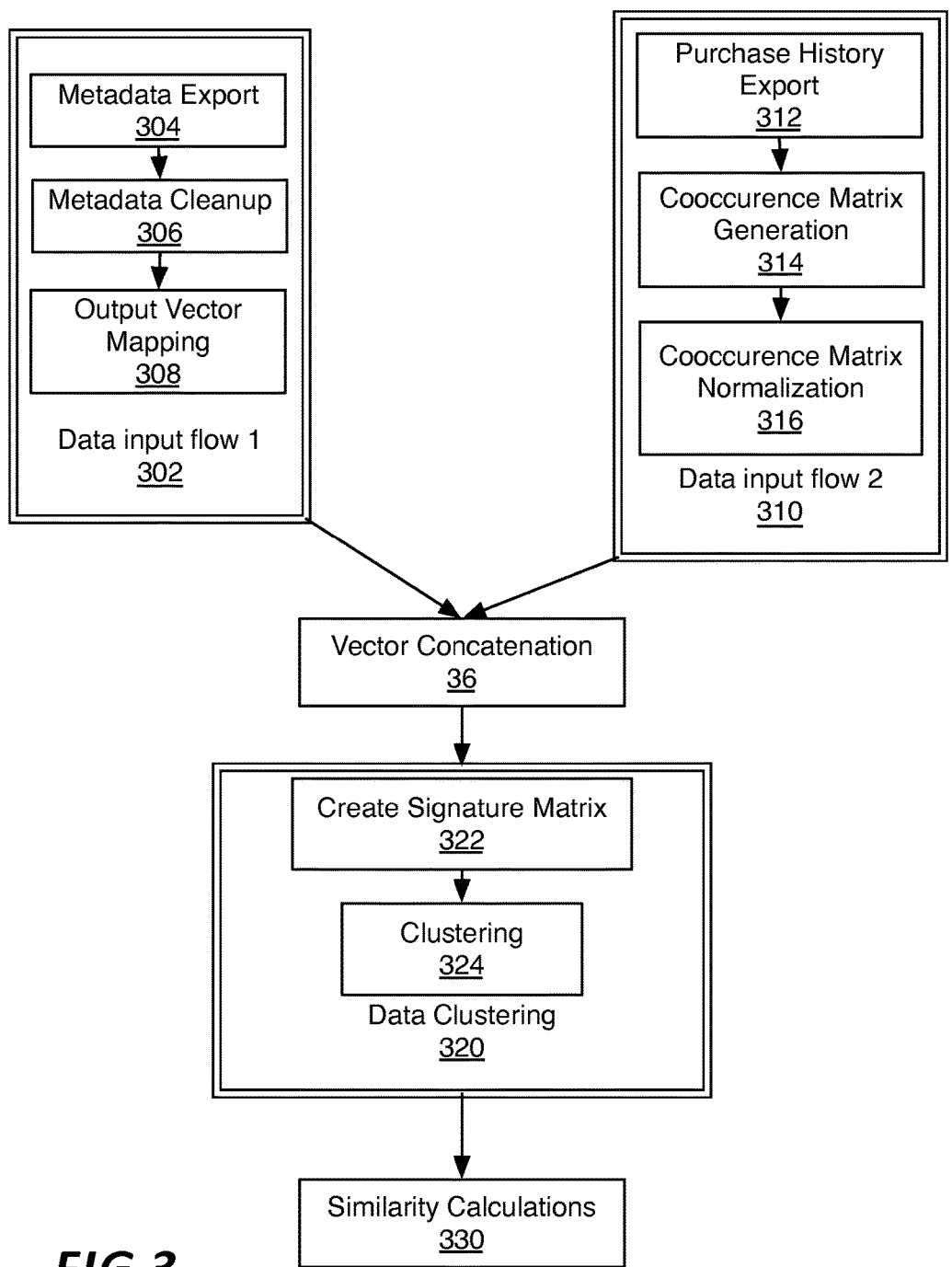
FIG. 3 illustrates an exemplary clustering system.

FIG. 3 illustrates an exemplary method of performing a clustering analysis. As illustrated two possible data input flows 302, 310 can be used (separately or in combination), as inputs into the clustering process. Data flow 302 includes metadata 304 describing characteristics of media items, while data flow 310 includes purchase history data describing how often media items are purchased together or listened to in sequence or are purchased by the same user.

With respect to data flow 302 metadata may need to be "cleaned up" 306 so that minor variations in meta-data are eliminated. Such variations in metadata can be the result of data being derived from more than one source, or from some attributes that can be represented in more than one way (e.g. 2 Pac, 2 Pac, 2-Pac). Once the metadata has be cleaned 306, it can be used to represent a media item as a vector 308.

With respect to data flow 310, purchase history data can be used to determine how often purchased media items co-occur in the same transaction or in multiple user's media libraries in a process that is similar to the collaborative filter similarity process performed on media items a user has in its media library as described herein. Such processing can result in the generation of a co-occurrence matrix 314. The co-occurrence matrix data can be normalized and represented as a vector 316.

In some embodiments only one data flow 302, 310 is used. In such embodiments, the vector concatenation process 318 is unnecessary and is skipped. However, when multiple data flows 302, 310 are used, the vectors representing media items output from each process must be combined in a vector concatenation process 318. The vectors can be mathematically combined to generate a new vector to represent each media item and input into the data clustering process 320.

The vectors output from media flows 302, 310, or 318 are highly dimensional. The vectors can be simplified though generation of a signature matrix 322. A signature matrix can be a conversion of the vectors as represented in a highly multi-dimensional space into a digital representation of binary 1's and 0's reflecting the presence or absence of a given attribute. The media items, now reflected in the signature matrix can be clustered 324 using a collision hashing algorithm that can hash similar input items into the same bucket. These buckets can then be mapped 330 or at least used to measure distances between the media items grouped within the buckets. The angular distance between each media item, or each bucket, can be used as a measure of similarity between the media items or buckets.

The clustering analysis can be used, for example, to determine genres and sub-genres that are similar and conversely which sub-genres are not similar. The clustering analysis can also be used to determine which media items are similar to other media items. Similarity and dissimilarity of clusters or media items can be determined by measuring how close or far two items map in a coordinate space or by representing clusters or media items as vectors and measuring the distance between the representative vectors. For example, each cluster can be mapped into a representative feature vector, and clusters that are within a determined distance of one another can be considered similar, while clusters that are greater than a determined distance of one another can be considered dissimilar. Likewise, by converting a cluster into a feature vector, it allows individual media items to be compared directly with the cluster to determine how similar an individual media item might be to a given cluster.

In some embodiments, the clustering analysis can be used to determine broad preferences within a media library. Many users have media item preferences that extend into multiple genres or other classifications. Clustering analysis can be useful to determine these preferences. For example, a user's music taste might include Alternative Rock (or some sub-genre, thereof), and Classical Music (or some sub-genre, thereof). By performing a clustering analysis on a user's library it can be determined that the user has tastes in these two genres, even though these genre's are not themselves similar. This information can be used to select media items that match the user's taste in Alternative Rock when the user is listening to a media station appropriate for such genre selections. By recognizing these different clusters representing a user's taste, it is possible to more exactly match selected media items to the user's preferences. If the user's multiple listening preferences were not identified and instead the user were considered to have just one musical preference, that musical preference might not be representative of the user's actual preferences. For example if the user's preference for Alternative Rock and Classical music resulting in a single representation of a user's taste, the result might be that the system would consider the user to enjoy Alternative Rock backed with symphony orchestras by blending the users divergent listening preferences. This might not actually reflect the user's preferences.

Clustering can also be used to determine a user's preferences in other media item attributes. For example, a clustering analysis of a music library might look like a user has a wide range in music listening preferences that spans Rock, Classic Rock, and Folk Rock. However, a clustering analysis might reveal that the user's preference is not related to the genre but rather the artist (e.g., Neil Young has album in each of the three genre's). Thus a feature vector can be created that represents the user's interest in Neil Young music and candidates can be selected by comparison to this feature vector, thus artists more like Neil Young would be more likely to be selected.

The above implementations of clustering analysis are merely representative. Clustering analysis could reveal that the user has a preference for any number of media item attributes. Such interests might need to be combined to result in a feature vector that is representative of the user's tastes, or multiple discrete feature vectors, each one being an appropriate measure of the user's preferences in the right circumstances.

Returning to FIG. 2, the results of the analysis performed by the clustering and similarity module 216 can be stored in feature vector database 218.

The above discussion describes the offline processing that is ultimately used to pre-compute databases 210 and 218 prior to their use in creating a media station. Database 210 includes media items owned by individual users and other media items that are deemed similar to media items the user owns. Database 210 also includes additional user preferences such as media item ratings, likes and dislikes, etc. Database 218 includes data regarding genres that are deemed similar and not similar. Database 218 also includes data regarding similarity of individual media items. The data stored in databases 210 and 218 are then utilized in the online processing portion of the system illustrated in FIG. 2. As addressed above, by "online" portion of the system it is meant that this portion of the system can be performed when a media station is requested—on demand, while the "offline" portion of the system is processed at regular intervals not related to a specific request for a media station. However, the labeling of one ore more features as online or offline is merely meant to be descriptive of one possible embodiment and not intended to be limiting. It will be appreciated by persons of ordinary skill in the art that any of the processing performed by the components of illustrated in FIG. 2 could be processed online or offline and still carry out the present technology.

When a media station request is received by the system illustrated in FIG. 2, rules governing the format of the requested station are retrieved from station generation rules database 242 by media station generation module 235. In some embodiments, media station generation rules can define formatted media stations based on a programming model, personalized stations, seed-based stations, and even sponsored stations. Each station generation rule will include one or more rules for selecting candidates and scoring candidates for a media station. Depending on the media station generation rule, media station generation module 235 will request a candidate meeting certain criteria from the candidate source API 228. The criteria for a candidate can be expressed in the specific interface used to communicate through the candidate source API 228. For example, the media station generation rule might designate a that a candidates should meet a "library song" criteria, a "complete my album" criteria, a similarity to a named seed track criteria, or other criteria by requesting such candidates using interfaces defined by the candidate source API 228. Some potential rules will be addressed in more detail below.

The request for candidates is ultimately fulfilled by databases 220, 224, 226, and 228. It will be appreciated by those of ordinary skill in the art that there can be more databases as needed for additional candidate selection criteria, or that the databases can actually be part of a single database.

The databases 220, 224, 226, and 228 can be populated from the offline databases 210 and 218, or other sources of data. For example user preference database 210 includes similarity data specifying media items in the online store that are similar to media items in a user's library based on a collaborative filtering analysis which is the same information that is stored in collaborative filter similarity database 220. Similarly, feature vector database 218 can be used to populate feature vector similarity database 222. Database 224 and 226 can be databases of editorially selected songs, or algorithmically collected databases associated with an online store. As such these databases can be populated from data in the online store database 214. These databases are presented merely as exemplary databases. Likely many other databases will exist.

In some embodiments, the databases can be genre specific or media station specific. Table 1 lists exemplary contents of three different media station specific databases for the media station "Alternative." The databases listed in Table 1 include "Alternative Seminal Artists" listing seminal artists for the Alternative station, "Alternative Critical Picks" listing editors picks for inclusion in the Alternative station, and "Alternative Core Heat Seekers" listing editor picks of new media items that are not yet charting on the Top 200 media items, or other configurable limit, of that type that may be label or programming priorities.

TABLE 1

| Alternative Seminal Artists | Alternative Critical Picks | Alternative Core Heat Seekers |
| --- | --- | --- |
| Neon Trees | The Calendar Hung Itself - Bright Eyes - Fevers and Mirrors | The Features - How It Starts - Wilderness |
| FUN. | One Chance - Omerta - One Chance - Single | The Temper Trap - Need Your Love - The Temper Trap |
| Of Monsters and Men | Internalize - Tall Birds - Internalize/The Sky Is Falling - Single | King Tuff - Keep On Movin' - King Tuff (Bonus Track Version) |
| Best Coast | Violent Men - Marion - Violent Men - EP | Redd Kross - Researching the Blues - Researching the Blues - Single |
| Death Cab For Cutie | The Empress - Brett Anderson - Wilderness (Bonus Version) | Husky - The Woods - Forever So |
| Lana Del Ray | Geraldine - Glasvegas - Glasvegas | The Walkmen - Love Is Luck - Heaven |
| Gotye | Daddy's Gone - Glasvegas - Glasvegas | Jukebox the Ghost - Somebody - Safe Travels (Bonus Track Version) |
| Broken Bells | Mr. Hurricane - Beast - Mr. Hurricane - Single | CocoRosie - We Are On Fire- We Are On Fire/Tears for Animals |
| Coldplay | Evacuate - The Boxer - Rebellion - Evacuate - Single of the Week | Friends - Friend Crush - Manifest! |
| Real Estate | Semi Automatic - The Boxer Rebellion - Union | Yeasayer - Henrietta - Henrietta - Single |
| Foster the People | Watermelon - The Boxer Rebellion - Exits | A Silent Film - Danny, Dakota & The Wishing Well - Sand & Snow |
| AWOLNATION | Plans - The Christophers - Plans - EP | The Hives - Go Right Ahead - Lex Hives (Deluxe Edition) |
| Gaz Coombs | Don't Talk In Your Sleep - Magik Markers - Balf Quarry | Ladyhawke - Girl Like Me - Anxiety |
| Michael Franti | Scanners - Vib Gyor - We Are Not An Island | Liars - No. 1 Against the Rush - Wixiw |
| The Big Pink | Red Lights - Vib Gyor - We Are Not An Island | Grass Widow - Under the Atmosphere - Internal Logic |
| Florence and the Machine | Tiny Daggers - Vib Gyor - We Are Not An Island | The Temper Trap - Trembling Hands - The Temper Trap |
| Black Keys | Church Bell - Vib Gyor - We Are Not An Island | Anna Ternheim - The Longer the Waiting (The Sweeter the Kiss) - The Night Visitor |
| Jack White | Ghosts - Vib Gyor - We Are Not An Island | Sigur Rós - Dau.alogn - Valtari |
| Alex Clare | Ultimatum - Vib Gyor - We Are Not An Island | Husky - Tidal Wave - Forever So |
| AWOLNATION | Rhombus Suit - Vib Gyor - We Are Not An Island | The Deer Tracks - W - W - Single |
| . . . | . . . | . . . |

Once the candidates are retrieved by the media station generation module 235, the candidates can be scored according to the media station generation rule by candidate scoring module 230. Candidates are scored according to their appropriateness for a given media station or slot in the media station. In addition to candidate scoring, some candidates need to be filtered by filtering module 232 according to one or more constraints.

Constraints can be used to limit what media items can be played on a given media station. In some embodiments the constraints are compliance constraints, such as those to comply with licensing terms or legal requirements such as the Digital Millennium Copyright Act (DMCA), licensing agreements, and or sponsorship agreements. For example, a media playback rule based on a legal regulation may prohibit the playback of more than three songs by an artist in a one-hour time period, or six skips per experience session. In another example, a media playback rule based on a legal regulation may prohibit the playback of more than three songs by an artist within a sequence of 15 songs. In a further example, a media playback rule based on a licensing agreement may relax the requirements of a legal regulation and allow the playback of at most 5 songs by an artist covered by the licensing agreement in a one-hour time period. In yet another example, a media station sponsored by a particular record label may define a media playback rule that completely prohibits playback of media items from a competitor record label or limits the number of media items from the competitor record label during a specified time period, such as one-hour. In still a further example, a media playback rule can be defined to limit the number of media items skipped by a user in a time interval, such as three skips in a one-hour time period.

In some embodiments a constraint can be based on user preferences or actions, such as user specified likes or dislikes, or even parental control preferences.

In some embodiments constraints can include editorial constraints. As is particularly true with media items, there can be a lot of diversity within genres such that some sub-genres don't mix well with other sub-genres. Editors can create a listing of sub-genre's that don't mix well. Such an exemplary listing is presented in Table 2, below. In the example presented in Table 2, an editor has noted a collection of sub-genre's that are not good matches with the basic alternative rock genre. As such a constraint will eliminate any song media item from being included in a media station based on the basic alternative rock genre if it is of a genre identified in Table 2.

TABLE 2

Alternative Unsafe Segue Sub-Genres

International Punk
Old School Industrial
Noise
Funk Metal
Stoner Rock
Grunge
Alternative Rock Singer-Songwriter
Two-Tone Ska Revival
Ska Punk
New Wave Rock
New Wave Pop
Original New Wave Scene
Original Post-Punk
Adult Alternative New Wave
General Industrial
Adult Alternative Pop
Adult Alternative Rock
Alternative Country
Christian Punk
Funk Metal
. . .

To apply some media playback rules, media playback historical data may be required. In some cases, media playback historical data can be maintained for only as long as is required to ensure that one or more media playback rules and/or any other rules are satisfied. For example, for a time based media playback rule, media playback historical data can be maintained for only as long as the longest time period, such as one-hour. In another example, for a media item sequence based media playback rule, media playback historical data can be maintained for only as long as the longest sequence length.

In addition to constraints/filtering module 232 and candidate scoring module 230, shuffling module 234 can be used to shuffle the order of candidates so that the same candidates are not selected every time and so that they do not always play in the same order.

Also illustrated in FIG. 2 is the user data aggregator module 236. This module aggregates data from an individual user's library, listening habits, and store purchases. Such data can be aggregated from one or more of the offline databases. The data from the user data aggregator module 236 can also inform the candidate scoring module to ensure that even media stations being created from formatted media stations based on a programming model or sponsored stations can be personalized for each individual user. Even sponsored stations that are provided by an advertiser to promote a product or media item can be configured to be personalized according to a user's taste. In one embodiment, a media station configured to play hit songs to a user will play different hit songs according to the tastes of each user that listens to the sponsored station.

FIG. 2 also illustrates a seed media item 240 being fed into the seed analyzer module 238 to be used for media stations created by taking into account one or more seed media items. Selected seed media items 240 are also relevant to user data as preferences since they are media items liked enough to be used as a seed.

As noted above, there are several types of media stations, and one of which is a formatted media station based on a programming model. FIG. 4A illustrates an exemplary programming model for a formatted media station of audio media items. As shown, media station 400 includes multiple format rules. Each format rule can be used to identify media item candidates that can used to create the media station. For example, a processor can execute a format rule to identify one or more media items from a media item database. These media items can be candidates for playback on the media station. In some embodiments, a media station can include an ordered list of slots where each slot is configured to store a format rule. Creation of the media station can involve iterating through the list of slots and applying the rules assigned to that slot. When playback advances to a given slot, format rule associated with the slot can be executed and a media item from the media item database can be selected.

As addressed above, a format rule can be used to select and/or weight candidate media items. Media items having a weighting above a cut off could be used in media station at the assigned slot. In some embodiments a media selection rule can be unique to a specific station. FIG. 4A illustrates exemplary formatting rules in a specified order as part of a media station programming model for creating a classic rock focused media station. Each format rule is assigned to a slot in the media station where during playback of the media station, media is sequentially played back according to the slot position. For example, the "Essentials Song Collection [Classic Rock]" format rule can be assigned to the first slot, followed the "Essentials Song Collection ['80s Rock]" format rule in the next slot. Each format rule can be configured to select a song that meets certain criteria. The "Essentials Song Collection [Classic Rock]" format rule is configured to select from the songs deemed essential in the classic rock category by editors of the online store while the "Essentials Song Collection ['80s Rock]" format rule is configured to select from the songs deemed essential in the '80s rock category by editors of the online store. Since a category of song or a song matching particular criteria is selected for each slot during playback, multiple playbacks of the media station can result in different songs being played back. When the song in the $18^{th}$ slot is played and no more slots remain, the media station can loop back to the first slot. During a second pass, the format rules can be applied again, thus resulting in the likely possibility of different media items being selected based on the format rule.

Depending on the configuration of the system, a selected of a media item can be performed from media stored on a media playback device or on a server. In one example, the media playback device selects a song for playback based on a format rule and subsequently requests the song from the server. In another example, the media playback device stores a predetermined number of media items that satisfy the format rule criteria and selects a media item to playback from the stored media items when a song associated with the format rule is scheduled for playback. In yet another example, the server can select a media item for playback that satisfies the criteria of the format rule and can subsequently transmit the song to the media playback device.

FIG. 4B illustrates an exemplary list of media items (songs in this example) that are scheduled to be played on a media station based on the programming model illustrated in FIG. 4A. In some embodiments, the scheduled list of media songs can presented to the user so that the user is aware of upcoming tracks, but more commonly, due to licensing restrictions, the upcoming tracks are not presented to the user (for example, the DCMA does not permit upcoming songs to be displayed to a user). In some embodiments, the current track and a predetermined number of upcoming tracks are presented to the user. For example, information related to the currently playing song and the next song schedule to be played can be presented to the user.

Formatted media stations can have any number of focuses. Some examples include topical stations (e.g. Christmas holiday station, a Valentine's Day station, and an Olympics station), sponsored stations, genre based stations, and editorially created stations. Each station can have a collection of format rules chosen by a station creator to emphasis the station's focus.

In addition to formatted media stations created based on a specified programming model, media stations can also be generated based on seed song specified by a user. Additionally, personalized media stations can be made that are specific to a user's tastes as determined from an analysis of the user's library and listening habits. For example, a media station can be created by analyzing user information that is already available to the content distribution service. Therefore, a personalized media station can be created without having the user provide a seed (e.g., user selected song, artist, genre, or other characteristic of music that is used to initially set up a station) or a parameter to create the station. In one example, an automatically generated media station can be preferred over a media station generated from a single seed. A media station that is generated based on a seed media item only has a single point of reference to the user's tastes and preferences. In contrast, a media station that is generated based on the available user information can have multiple points of reference to the user's tastes and preferences and media playback history. The multiple data points can be synthesized into a vector and compared against the results of the clustering analysis addressed above to determine media items that are closely related to the user's taste.

In some embodiments, the multiple data points can include a representation of the user's experience habits over time. It can be inferred that the most recent media experience history more accurately represents the user's current preferences as well as trends in recent listening and purchasing. In such embodiments, the user's more recent media experience data can be more heavily weighted in determining a user's preferences, and be extension more heavily weighted in determining media items appropriate for the user's taste. It will be appreciated that a user's taste will vary over time as well as between specific genres or styles of music.

As noted, a media selection rule can define which media items are candidates for playback on a particular media station. A media selection rule can also define which media items are not to be played on a particular station. A media selection rule can also be defined based on one or more general constraints or predefined criteria, such as genre, artist, album, record label or commercial priority. Additionally, a media selection rule can be defined in terms of a seed item, such as a media item, album, genre, or artist. A media selection rule based on a seed media item can also include a measure of similarity. By applying a seed based media selection rule, media items determined to be sufficiently similar to the seed item can be selected as a candidate for playback on the media station. Furthermore, a media selection rule can be defined based on user characteristics, location information, or demographic information. For example, a media selection rule can specify that media should be chosen that is popular for users matching the user characteristic values of "male," and "ages 18-22." In some cases, this determination can be based on metadata associated with the media items. A media selection rule can also be based on user preferences, such as user specified likes or dislikes, or even parental control preferences.

As is apparent from the above, media stations are very customized to each specific user even though each media station is generated from the same media selection rules organized into the same sequence based on the station format. As such, if a first user were to refer a second user to a media station, the second user would experience a media station very different than the first user because each would be experiencing the station according to their own preferences. However, in some embodiments, a user may share their own version of a media station with another user. In such embodiments, the first user can share her version of the media station with the second user. The second user will then experience the media station according to the first user's preferences. It is not generally possible to merely send the same exact collection of media items to a second user without purchasing or gifting the media items due to licensing restrictions.

Media selection rules can be generally grouped into rules that are designed to select popular media that matches a user's taste, new media that matches a user's taste, best selling media that matches a user's taste. In such instances media selection rules are designed to select new or popular media items that matches a user's taste for presentation to a user. Media selection rules can also be driven by an objective of selling or recommending media items to a user. For example, media selection rules might select media items that a user is most likely to purchase. Media selection rules can also be driven by an objective of exposing a user to media that is currently being promoted based on commercial priorities and/or relevant to consumers in the culture at any given time. Other media selection rules can be driven by a cost saving objective (cost savings to the media service) by selecting media items a user already owns and already has the rights to listen to on a media playback device. Other media selection rules can be driven by an objective of playing media items already familiar to a user by selecting media items a user already owns or has already experienced. Some media selection rules can be configured to select a media item that will go well with other media items in a media station by selecting media items that are similar, match genre requirements, tempo requirements, etc. A well selected collection of media selection rules should take into account a user's preferences as well as one or more business goals such as selling media items or promoting media items.

While media selection rules can come in many forms, some exemplary media selection rules include the following:

HEAT-SEEKER: A pool of new media items that are not yet charting on the Top 200 media items of that type that may be label or programming priorities and will add fresher content to media stations. In some embodiments, safe segue genres can be ignored.

LISTENERS ALSO BOUGHT: Similarity data that takes into account user purchases in addition to other similarity metrics, such as media item co-occurrence.

LISTENERS ALSO LISTENED TO: Similarity data that takes into account user experiences in addition to other similarity metrics, such as media item co-occurrence.

CRITICAL PICK: A pool of media items per top level genre or sub genre that helps to infuse the online store's editorial voice into stations—critically acclaimed, deeper cuts, can cover media items that may be missed by the Heat-Seeker media selection rule. In some embodiments, safe segue genres can be ignored.

COMPLETE MY ALBUM: Selects the next best selling track the user does not own from an album the user does not own within the a list of safe segue genres. In some embodiments, the Complete My Album media selection rule ranks the albums by the number of songs the user already owns to favor converting album sales.

SELECT FROM [CATEGORY/COLLECTION]: In some embodiments, collection of media items may be organized during the offline processing process. For example, editors may have designated a collection of key tracks for certain genres, or moods, or editors may have otherwise curated a collection of media items that can be utilized as a pool from which media items may be selected.

SALES LEADER: Selects media items within a specified genre the online store with a top sales ranking. If the media rule calls for media items from a specified period, sales leader may be selected from historical trade/industry sales data. Only select media items matching safe segue genres. In some embodiments, prefer media items released more recently. In some embodiments, user media item similarity data can be used to narrow selection.

LIBRARY SONG: Selects the highest play count & recently played song in a specified genre or safe segue genre from the User's Media Library/Purchase History when the candidate song is deemed appropriate for the media station. In some embodiments, prefer media items released in the last 12 months.

In some embodiments, any media selection rule can be sub-ordinate to, or have one or more other rules sub ordinate to it. For example, if the Heat-Seeker media item selection rule is used to select a media item, the Best Version Media Selection rule can be used to select a version that the user is most likely to favor.

In some embodiments, if a media selection rule is unable to provide a useable candidate, a fallback rule can be used to select, for example, a Critical Pick or other editorially-derived media item candidate.

SAFE SEGUE SUB-GENRES/CORE SUB-GENRES: As is particularly true with media items, there can be a lot of diversity within genres such that some sub-genres don't mix well with other sub-genres. These media selection rules select media items from an listing of sub-genre that is determined to be safe, or core (substantially related) by editors. Table 3 presents an exemplarily listing of safe and core sub-genres for the "Alternative" media station, which is based on alternative rock.

TABLE 3

| Alternative Guard Rail/ Safe Segue Sub-Genres | Alternative Core Sub-Genres |
|---|---|
| Alternative Pop | General Alternative Rock |
| Alternative Folk | Alternative Pop Singer-Songwriter |
| Alternative Country | Alternative Dance |
| Math Rock | Alternative Guard |
| General Indie Pop | |
| General Indie Rock | |
| Rock Singer-Songwriter | |
| Post Punk Revival | |
| Alternative Female Prog Rock | |
| Alternative Folk | |
| Other Alternative Hip-Hop/Rap | |
| Indie Cabaret Pop-Rock | |
| Lo-Fi | |
| Neo Glam | |
| Neo Prog Rock | |
| Neo-Psychedelic | |
| Post-Modern Art Music | |
| Post-Rock | |
| Slowcore | |
| Punk Pop | |
| . . . | |

BEST VERSION: For media items having several versions, this media item selection rule selects a version of a media from the several versions that a user is most likely to favor. A user may be more likely to favor one media item version over another because of an observed preference, such as for live tracks, or studio recorded tracks, or my favor one media item version because it fits better with other media items in the media station. Additionally, some versions of media items might cross genres, such as with remixes of audio tracks, and a user might be determined to appreciate one genre more than the other.

It will be appreciated that the specific media selection rules referenced herein are merely exemplary. The media selection rules referenced herein can have other or different criteria than that listed herein. Likewise other or different media selection rules are also possible and within the scope of the present technology.

Integration between an online store, user's personal media statistics, and a media station creation system in the manner described above enables the creation of superior media stations compared to those available today. But such integration can be cyclical such that additional data generated from the media station creation system can be used to refine data (feature vectors) that describe the user's media preferences, and especially the user's current listening preferences, which can then be used to create even better media stations. Additionally data generated from the media station creation system can be utilized by the online store to provide a better experience to the user there as well. For example, a media item that was recently experienced by the user while experiencing a media station generated by the media station generation system can be promoted to the user in the online store. This can be especially helpful in situations wherein the user rated the media item highly, explicitly tagged the media item, put the media item in their wishlist, or implicitly suggested interest in consumption through repeated exposure to the media item without skips or bans, and therefore might be interested in purchasing the media item.

Figure 5:
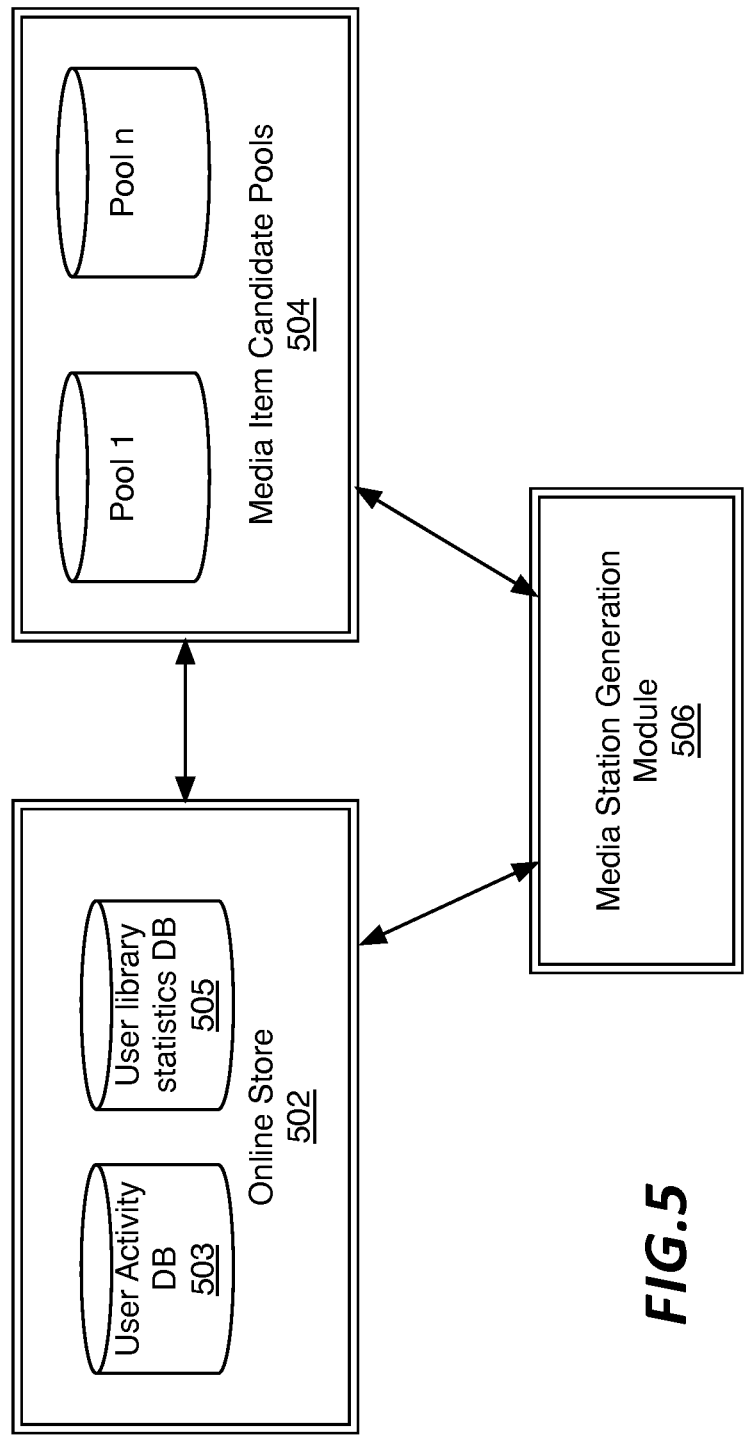
FIG. 5 illustrates a system in which an online store, media items pools, and media station creation module reflexively influence each component of the system.

FIG. 5 illustrates a Reflexive Algorithmic Assisted & Heuristics-Driven (RAAHD) Media Station Generation Engine. The system illustrated in FIG. 5 takes into account the interaction between store 502, user activity and user media library 503, 503, and media station generation module 506 by having each influence the other dynamically. The system can have the data and insights to operate an online store which dynamically adapts to the media station experience habits of the user. For example, "Listener's Also Bought" data generated from analysis of a population of users' library statistics 505 and stored in a media item candidate pool 504 such as pool 1, can be co-mingles that with "Listener's Heard on Media Station" data in pool n and personalize that further based on the specific users. Factors such as recency, pattern matching that predictively leads to a sale, analyzing the number of impressions and even the timing of those impressions all become possible once the environments are integrated to work reflexively or even predictively.

More specifically FIG. 5 illustrates that data from the online store 502 can be processed to create one or more pools of media item candidates 504. Furthermore, media item pools can be used by online store to select media items to promote to a user in the online store. For example, as addressed above, data from the online store 502 can be used to generate a pool of media items that other users also bought in combination with media items already contained in the user's media library. This pool can be used to select a media item(s) to promote in the online store. Likewise the same pool of media items that users also bought can be used by media station generation module 506 to select a candidate media item for potential inclusion in a media station.

In another example, media items presented to a user by media station generation module 506 can be stored in a pool 504 of recently played media items and recorded in the user activity database 503. Such pool can be used by the online store 502 to select media items to promote to the user. As media items are purchased by the user, data user library statistics database 505 can be updated resulting in updates to the media item candidate pools 504, which in turn refines media items selected by media station generation module 506.

Figure 6:
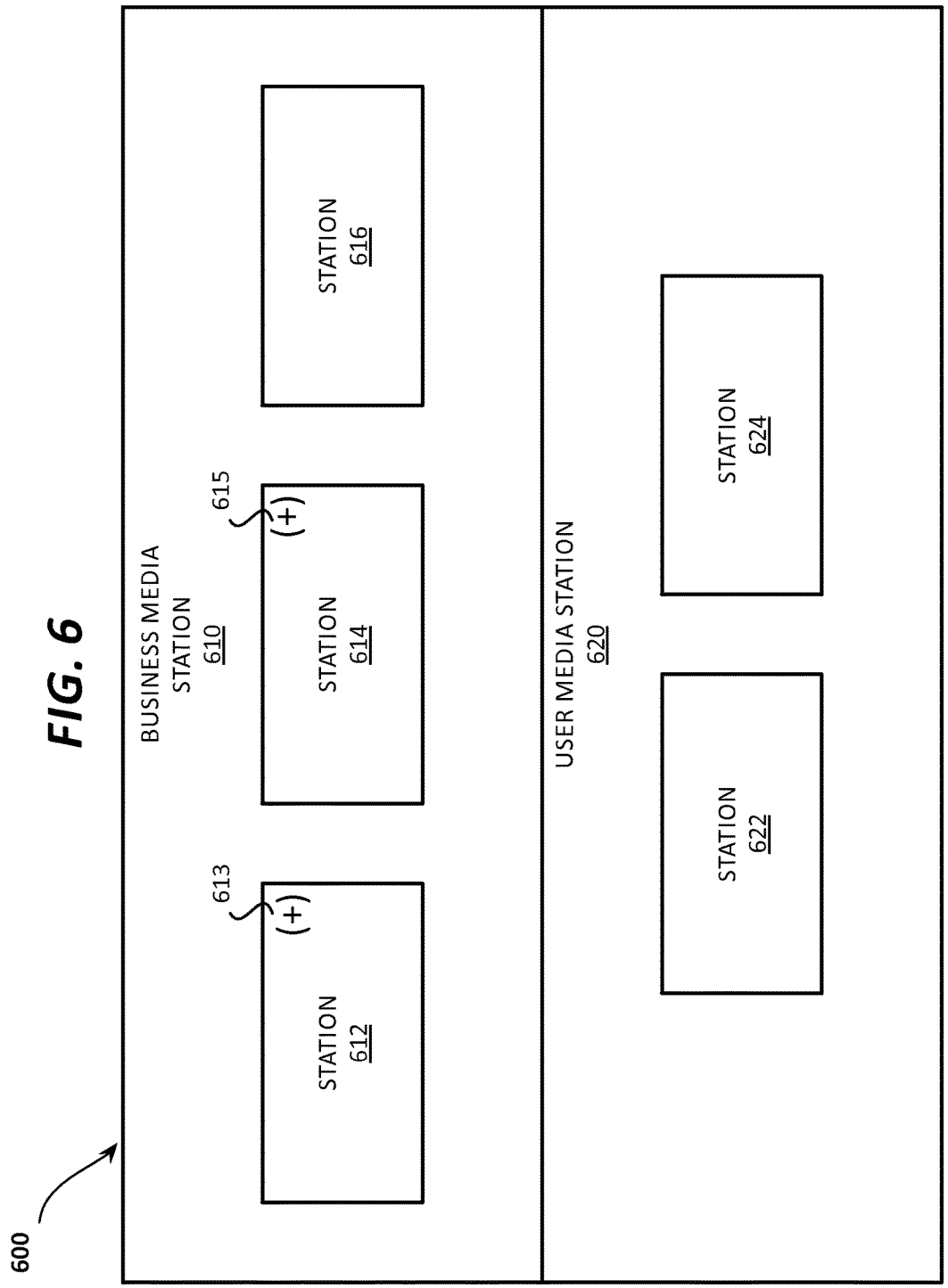
FIG. 6 illustrates an exemplary media station user interface.

FIG. 6 illustrates an exemplary media station user interface. User interface 600 can be configured to present available media stations on a client device. Selection of a media station from user interface 600 can result in the processing of the media station to identify appropriate content to be played. In one example, identified content can meet format rules of the media station. As shown, user interface 600 includes two sections: a business media station section and a user media station section. The business media station section can be configured to present business media stations such as editorial and sponsored stations. In contrast, the user media station section can be configured to present user media stations that have been personalized for the user. Business media station section 610 includes stations 612, 614, and 616. User media station section includes stations 622 and 624.

As shown, some business media stations can include an icon. For example, station 612 includes icon 613 while station 614 includes icon 615. Station 616 does not have an icon. When the icon is selected, the business media station associated with the icon can be converted into a user media station. Conversion from a business media station to a user media station can include changing the properties and attributes of the media station. For example, a business media station can select media according to different rules than a user media station. As another example, a business media station can have access to different user information than a user media station. For instance, a user media station can select media items for playback according to the user library metadata such as the user's music ratings but not the user's business information such as the user's billing information. The conversion can result in the addition of a new user media station that appears in the user media station section 620. In some examples, the business media station may disappear from business media station 610. In other examples, the business media station may remain in the section but the icon to convert the station disappears.

Figure 7A:
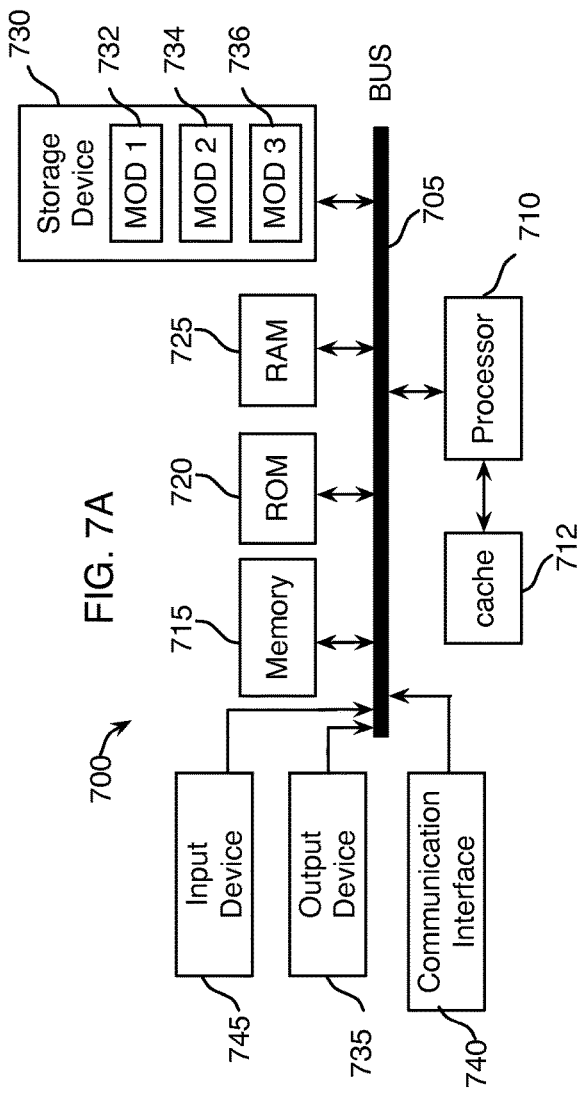
FIGS. 7a and 7b illustrate an exemplary computing arrangement for executing programming modules of the disclosed technology.
Figure 7B:
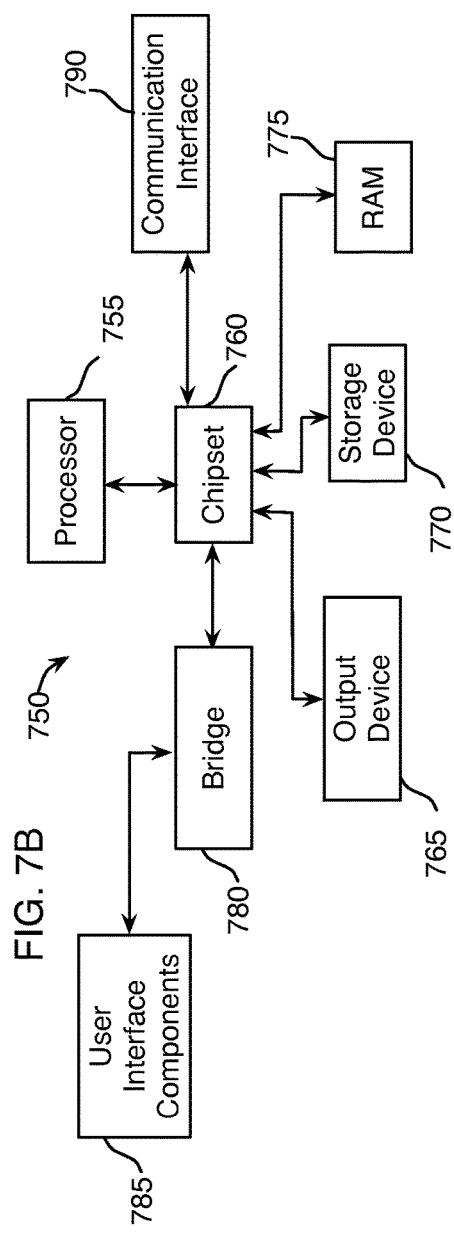

FIG. 7A, and FIG. 7B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer implemented method of generating a media station for a particular user by a media station generation system, the method comprising:
   analyzing, in an offline process not related to a request for generating a media station, a media library and media item experience history associated with a particular user account to generate a user preferences database, wherein the media item experience history includes data regarding media item experience data within the media library, media items presented to the particular user account, and media items experienced within an online store;
   analyzing, in the offline process, the online store database that includes metadata for media items targeted to the particular user account for purchase in the online store;
   generating, in the offline process, a similarity database that includes a plurality of clusters that group a collection of media items based on determined similarities, wherein the similarity database includes a plurality of feature vectors that represent attributes for the clusters;
   executing, in an online process triggered by the request for generating the media station, a media station generation process to create the media station in accordance with a programming model having a set of ordered programming slots and a plurality of media selection rules respectively assigned to each programming slot from the set of ordered programming slots, the media station generation process comprising:
   selecting, based on a first media selection rule assigned to a first programming slot and the similarity database, a first media item to be performed in the first programming slot, wherein the first media item is associated with a first data vector that is similar to one of the feature vectors in the similarity database; and
   selecting, based on a second media selection rule assigned to a second programming slot ordered after the first programming slot, a second media item that matches user preferences stored within the user preference database for the particular user account; and
   sending the selection of the second media item to a client device for performance of the second media item in the second programming slot, wherein the second media selection rule is different than the first media selection rule, and wherein the second media selection rule selects the second media item from a different database of the similarity database and the online store database than dictated by the first media selection rule.

2. The method of claim 1, wherein the similarity database is generated from performing a locality sensitive hashing operation.

3. The method of claim 1, wherein selecting a first media item comprises:
   selecting a set of candidate media items and weighting the set of candidate media items based on the first media selection rule; and
   selecting the first media item based on the weighting.

4. The method of claim 3, wherein the media item experience history includes data regarding recency of a last experience, and the step of weighting the set of candidate media items gives a higher weight to media items the particular user account has experienced more recently than other media items.

5. The method of claim 1, further comprising:
   analyzing a population of the particular user account's ownership of media items to determine how often media items co-occur in the population of user's media libraries; and
   generating a collaborative filter database to store results of the analysis of the population of the particular user account's ownership of media items.

6. A media station generation system comprising:
   one or more computer processors; and
   a memory containing instructions that, when executed by the one or more computer processors, cause the media station generation system to:
      analyze, in an offline process not related to a request for generating a media station, a media library and media item experience history to generate a database of user preferences associated with a particular user account, wherein the media item experience history includes data regarding media item experience data within the media library, media items presented to the particular user account, and media items experienced within an online store;
      analyze, in the offline process, an online store database that includes metadata for media items targeted to the particular user account for purchase in an online store;
      generate in the offline process, a similarity database that includes a plurality of clusters that group a collection of media items based on determined similarities, wherein the similarity database comprises a plurality of feature vectors that represent attributes for the clusters;
      create, in an online process caused by the request and by a media station generation process, a media station in accordance with a programming model having a set of ordered programming slots and a plurality of media selection rules respectively assigned to each programming slot from the set of ordered programming slots, the media station generation process comprises instructions to:
         select, based on a first media selection rule assigned to a first programming slot and the similarity database, a first media item to be performed in the first programming slot, wherein the first media item is associated with a first data vector that is similar to one of the feature vectors in the similarity database; and
         select, based on a second media selection rule assigned to a second programming slot ordered after the first programming slot, a second media item that matches user preferences stored within the user preference database for the particular user account; and
         send the selection of the second media item to a client device for performance of the second media item in the second programming slot,
      wherein the second media selection rule is different than the first media selection rule, and wherein the second media selection rule selects the second media item from a different database of the similarity database and the online store database than dictated by the first media selection rule.

7. The media station generation system of claim 6, wherein the similarity database is generated from performing a locality sensitive hashing operation.

8. The media station generation system of claim 6, wherein the instructions to select a first media item comprises instructions that cause the media station generation system to:
   select a set of candidate media items and weight the set of candidate media items based on the first media selection rule in addition to user preference criteria; and
   select the first media item based on the weight.

9. The media station generation system of claim 8, wherein the media item experience history includes data regarding recency of a last experience, and the instruction to weight the set of candidate media items gives a higher Fweight to media items the particular user account has experienced more recently than other media items.

10. The media station generation system of claim 6, wherein the instructions further cause the media station generation system to:
    analyze a population of the particular user account's ownership of media items to determine how often media items co-occur in the population of the media libraries; and
    generate a collaborative filter database to store results of the analysis of the population of the particular user account's ownership of media items.

11. A non-transitory computer-readable medium containing instructions that, when executed by a computing system, cause the computing system to:
    analyze, in an offline process not related to a request for generating a media station, a media library and media item experience history associated with a particular user account to generate a user preferences database, wherein the media item experience history includes data regarding media item experience data within the media library, media items presented to the particular user account, and media items experienced within an online store;
    analyze, in the offline process, the online store database of media items targeted to the particular user account for purchase in the online store,
    generate in the offline process, a similarity database that includes a plurality of clusters that group a collection of media items based on determined similarities, wherein the similarity database comprises a plurality of feature vectors that represent attributes for the clusters:
    create, in an online process trigger by the request and by a media station generation process, a media station in accordance with a programming model having a set of ordered programming slots and a plurality of media selection rules respectively assigned to each programming slot from the set of ordered programming slots, the media station generation process comprises instructions to:
  select, based on a first media selection rule assigned to a first programming slot and the similarity database, a first media item to be performed in the first programming slot; and
  select, based on a second media selection rule assigned to a second programming slot ordered after the first programming slot, a second media item that matches user preferences stored within the user preference database for the particular user account; and
  send the selection of the second media item to a client device for performance of the second media item in the second programming slot,
  wherein the second media selection rule is different than the first media selection rule, and wherein the second media selection rule selects the second media item from a different database of the similarity database and the online store database than dictated by the first media selection rule.

12. The non-transitory computer-readable medium of claim 11 wherein the similarity database is generated from performing a locality sensitive hashing operation.

13. The non-transitory computer-readable medium of claim 11, wherein the instructions to select a first media item comprises instructions that cause the computing system to:
  select a set of candidate media items and weight the set of candidate media items based on the first media selection rule in addition to user preference criteria; and
  select the first media item based on the weight.

14. The non-transitory computer-readable medium of claim 13, wherein the media item experience history includes data regarding recency of a last experience, and the instruction to weight the set of candidate media items gives a higher weight to media items the particular user has experienced more recently than other media items.

15. The non-transitory computer-readable medium of claim 11, wherein the instructions further cause the computing system to:
  analyze a population of the particular user account's ownership of media items to determine how often media items co-occur in the population of the media libraries; and
  generate a collaborative filter database to store results of the analysis of the population of the particular user account's ownership of media items.

16. The method of claim 1, further comprising:
  storing an editorial database of media item candidates that an editor has approved as candidates, wherein the second media selection rule selects the second media item from a different database of the similarity database, the editorial database, and the online store database than dictated by the first media selection rule.

17. The method of claim 1, wherein generating the similarity database comprises:
  generating a data vector for each media item of the collection of media items with metadata of the media items stored in the online store database, wherein each data vector is indicative of one or more attributes for a respective media item;
  grouping the data vectors into the clusters based on a determination that the data vectors within the clusters are within one or more predetermined proximities; and
  generating a plurality of feature vectors that represent overall attributes for the clusters.

18. The media station generation system of claim 6, wherein the instructions further cause the media station generation system to:
  store an editorial database of media item candidates that an editor has approved as candidates, wherein the second media selection rule selects the second media item from a different database of the similarity database, the editorial database, and the online store database than dictated by the first media selection rule.

19. The media station generation system of claim 6, wherein the instructions to generate the similarity database comprises instructions that cause the media station generation system to:
  generate a data vector for each media item of the collection of media items with metadata of the media items stored in the online store database, wherein each data vector is indicative of one or more attributes for a respective media item;
  group the data vectors into the clusters based on a determination that the data vectors within the clusters are within one or more predetermined proximities; and
  generate a plurality of feature vectors that represent overall attributes for the clusters.

20. The non-transitory computer-readable medium of claim 11, wherein the instructions further cause the computing system to:
  store an editorial database of media item candidates that an editor has approved as candidates, wherein the second media selection rule selects the second media item from a different database of the similarity database, the editorial database, and the online store database than dictated by the first media selection rule.

21. The media station generation system of claim 11, wherein the instructions to generate the similarity database comprises instructions that cause the computing system to:
  generate a data vector for each media item of the collection of media items with metadata of the media items stored in the online store database, wherein each data vector is indicative of one or more attributes for a respective media item;
  group the data vectors into the clusters based on a determination that the data vectors within the clusters are within one or more predetermined proximities; and
  generate a plurality of feature vectors that represent overall attributes for the clusters.

* * * * *

UNITED STATES PATENT AND TRADEMARK OFFICE
CERTIFICATE OF CORRECTION

| | |
|---|---|
| PATENT NO. | : 10,504,156 B2 |
| APPLICATION NO. | : 13/913332 |
| DATED | : December 10, 2019 |
| INVENTOR(S) | : Eva Hohei Mok et al. |

It is certified that error appears in the above-identified patent and that said Letters Patent is hereby corrected as shown below:

In the Claims

Column 28 Line 33: Replace the word "Fweight" with the word --weight--.

Signed and Sealed this
Twenty-eighth Day of January, 2020

Andrei Iancu
*Director of the United States Patent and Trademark Office*